(12) United States Patent
Christoffer et al.

(10) Patent No.: US 8,342,307 B2
(45) Date of Patent: Jan. 1, 2013

(54) SYNCHRONIZING RING

(75) Inventors: Ulf Christoffer, Bremen (DE); Marcus Spreckels, Bremen (DE)

(73) Assignee: Sulzer EUROFLAMM Germany GmbH, Bermen (DE)

( * ) Notice: Subject to any disclaimer, the term of this patent is extended or adjusted under 35 U.S.C. 154(b) by 920 days.

(21) Appl. No.: 11/904,095

(22) Filed: Sep. 25, 2007

(65) Prior Publication Data
US 2008/0149450 A1 Jun. 26, 2008

(30) Foreign Application Priority Data

Dec. 22, 2006 (EP) .................................... 06126962

(51) Int. Cl.
*F16D 23/06* (2006.01)

(52) U.S. Cl. .................. 192/53.34; 192/53.32

(58) Field of Classification Search ............... 192/53.34, 192/53.32, 53.341, 53.342, 53.343, 53.33
See application file for complete search history.

(56) References Cited

U.S. PATENT DOCUMENTS

| 5,135,087 | A | * | 8/1992 | Frost ............................ 192/53.31 |
| 5,657,844 | A | * | 8/1997 | Wagner ....................... 192/53.32 |
| 6,324,930 | B1 | * | 12/2001 | Forsyth ........................... 74/446 |
| 6,533,091 | B1 | * | 3/2003 | Kawada et al. ............. 192/53.32 |
| 7,717,247 | B2 | * | 5/2010 | Stockl et al. ............... 192/53.34 |

FOREIGN PATENT DOCUMENTS

| EP | 0 717 212 A1 | 6/1996 |
| JP | 62-46048 A | 2/1987 |
| JP | 2-069129 U | 5/1990 |
| JP | 5-157127 A | 6/1993 |
| JP | 08290227 A | 5/1996 |
| JP | 8-219173 A | 8/1996 |
| JP | 8-290227 A | 11/1996 |
| JP | 9-222134 A | 8/1997 |
| JP | 10-78047 A | 3/1998 |
| JP | 10-246245 A | 9/1998 |
| WO | WO 00/11367 A1 | 3/2000 |
| WO | WO 03/062659 A1 | 7/2003 |

OTHER PUBLICATIONS

Japanese Office Action mailed on Oct. 2, 2012 for JP Patent Application No. 2007-286851, English translation only, 4 pages.

* cited by examiner

*Primary Examiner* — David D Le
*Assistant Examiner* — Ryan Dodd
(74) *Attorney, Agent, or Firm* — Kilpatrick Townsend & Stockton LLP

(57) ABSTRACT

A synchronizing ring includes a conical ring body with an inner friction surface and an outer installation surface, which bound the ring body and extend conically. The ring body is bounded in the axial direction at a largest cone diameter by a gear wheel surface with a gear wheel extending substantially perpendicular to the synchronizing ring axis and is bounded at a smallest cone diameter by a surface. A recess is provided at the surface of the synchronizing ring for fixing the inner ring with a security against rotation of the inner ring. A raised or displaced portion is provided at the surface of the synchronizing ring and an undercut is provided at the inner ring, so that the displaced portion can engage in the undercut in such a way that an overall height of the synchronizing ring set is not enlarged by the displaced portion.

18 Claims, 7 Drawing Sheets

SYNCHRONIZING RING

CROSS-REFERENCES TO RELATED APPLICATIONS

This application claims the priority of European Patent Application No. 06126962.7, filed Dec. 22, 2006, the disclosure of which is incorporated herein by reference.

BACKGROUND OF THE INVENTION

The invention relates to a synchronizing ring for a synchronizing apparatus of a switchable gear changing transmission.

Synchronizing rings in a mechanically switchable gear changing transmission, for example in vehicle gearboxes, serve to compensate relative speeds occurring during a gear change between a gear wheel and a gear shaft. In this connection the synchronization is achieved by friction between the corresponding friction partners. The method of operation of gears of this kind and the operating sequence of the synchronization process are known per se and do not need to be explained more closely to the person averagely skilled in the art.

For protection against premature wear and/or for the improvement of the friction characteristics it is known to provide the friction surfaces of synchronizing rings which are, as a rule, manufactured from a metal or a metal alloy, such as from brass or steel for example, with a friction layer. In this connection, completely different types of friction layers are in use, for example thermal spray layers made of molybdenum, carbon friction layers or friction layers made of other materials.

However, not only are ever increasing demands made on the characteristics of the friction layers by the ever increasing loads which act on the synchronizing rings in the operating state, but also the strength and stiffness of the synchronizing rings per se, i.e. of the synchronizing ring body, are increasingly the subject of current developments in transmission design.

A synchronizing ring is disclosed in DE 197 13 304 B4 for example, which is formed without cutting from a thin-walled, through hardenable, steel band, with means for stiffening being provided at a contact surface or at regions of the synchronizing ring projecting from the friction surface while retaining the load carrying part of the friction surface.

In this connection the means for stiffening in accordance with DE 19 13 304 B4 can be realized by means of different measures. For example, a solid rim which starts from one edge of the friction surface and forms a rim directed radially to the inside or a free end of the synchronizing ring can be provided at the end with a coined feature or upset portion which increases the wall thickness.

Although an increase in the solidity and stiffness of the synchronizing ring can be achieved through the measures discussed in DE 197 13 304 B4, all the solutions shown there have a decisive disadvantage which results in particular from the fact that the retention of the load carrying part of the friction surface is absolutely demanded as a central feature of these synchronizing rings, regardless of how or by using what measures the stiffening of the synchronizing ring is to be achieved.

In this kind of synchronizing ring it is to be feared that in the operating state, in particular under high loads and/or if very fast gear changes of the transmission are required, an only inadequate lubrication takes place between the contact surface of the synchronizing ring and its counterpart. This is because, among other things, during the synchronizing process, too much oil is displaced in the radial direction by axial pressure on the contact surface of the synchronizing ring, so that the contact surface, which rotates with a certain relative speed relative to its counterpart, stands in friction contact with its counterpart more or less without lubrication, which leads to premature signs of wear on the synchronizing ring and its counterpart and, in the worst case with heavy loads, to spontaneous damage to the corresponding surfaces.

A carrier for a cone-shaped synchronizing ring is described in DE 35 19811 A1 which has an outer gear ring divided into thirds and which is arranged in a cylindrical cavity of a synchronizing ring hub, which is often referred to as a synchronizing ring body and is substantially rotationally fixedly anchored to the synchronizing ring hub via abutments which are formed as lugs. "Substantially rotationally fixedly" means in this connection, within the context of this application, that the synchronizing ring is rotationally fixedly connected to the synchronizing ring hub apart from slight angular movements in the peripheral direction of the synchronizing ring.

DE 198 53 856 A1 describes a continuation of the above-described synchronizing ring, wherein the synchronizing ring of DE 198 53 856 A1 is characterized in that its width is substantially only determined by the required width of its friction surface. This is achieved by the fact that an abutment which corresponds with regard to its function to the lugs in accordance with DE 35 19811 A1 is arranged at or near to an end section of the ring body with a smaller cone diameter, and also the contour of the abutment projects in the radial direction beyond the contour of the external jacket surface of the ring body.

Both synchronizing rings are in principle well secured in the operating state against relative rotation with regard to the synchronizing ring hub by the lugs or abutments, however they both lack a reliable guide in the radial direction in the cylindrical cavity in the synchronizing ring hub.

This means that the synchronizing rings known from the prior art are normally secured against a rotation in the peripheral direction in relation to the synchronizing ring hub, however these rings have an increased tendency towards uncontrolled movements, e.g. to small radial excursions or tilting movements due to their conical outer shape, which cooperates with a cylindrical inner contact surface in the cylindrical cavity of the synchronizing hub. These uncontrolled movements can express themselves for example in unpleasant vibrations, thus exerting a negative influence on the reliability and precision of the synchronizing process. This can lead to an increase in the switching times, to faster and increased wear of the friction surface and of the entire synchronizing ring and thus to shorter repair and servicing intervals, quite apart from the fact that the ease of gear changing and the driving comfort of a heavy goods vehicle is considerably limited by the poor guidance of the synchronizing ring in the cavity of the synchronizing ring hub and the uncontrolled movements. These effects become all the more significant the more power or torque has to be switched by a corresponding transmission.

In a simple case a synchronizing ring set comprises a synchronizing ring and an inner ring and the inner ring can be constructed in metal, in brass, in a sintered metal, in a plastic, in a composite material or in any other suitable material. In order to improve the friction with a friction partner the inner ring can be coated or covered with a friction coating, for example with a carbon layer. In the synchronizing ring itself, which has an outer toothed ring, at least in sections, recesses are provided in a manner known per se, into which lugs of the inner ring can engage, so that the inner ring is rotationally fixedly connected to the synchronizing ring.

It is important in this connection that the inner ring is, in no operating state, significantly displaced in the axial direction relative to the synchronizing ring, since in such a case the lug of the inner ring can slip out of the recesses of the synchronizing ring so that the inner ring is no longer secured against rotation relative to the synchronizing ring, which can lead to destruction or at least to considerable damage to the transmission.

If a synchronizing ring set is in operation for a long period of time, it goes without saying that it is subject to a certain degree of wear which leads to a mechanical erosion of the components of the synchronizing ring set, for example by wear of the friction coating, in other words, for example, of the carbon friction layer, so that pre-set tolerances can no longer be maintained, making it ultimately possible that the lug of the inner ring jumps out of the recess in the synchronizing ring, leading to the above-mentioned damage to the transmission.

Thus, the tolerances of the individual components, which underlie the design of the synchronizing ring set and which arise in the course of time, have to be taken into consideration. For this reason one attempts to increase the length of the lugs of the inner ring more than would actually be necessary for the function of the inner ring (namely the holding of the inner ring in the synchronizing ring) without tolerance considerations for example due to wear being necessary.

These lugs cannot be selected to be of any length however, because otherwise a collision with the components behind the synchronizing ring (synchronizing ring body) could result.

A concept for resolving this is to provide bulges or raised portions in the synchronizing ring at the level of the recesses for the lugs of the inner ring, for example in the form of thickened portions. By this means shorter lugs would also be held securely. The disadvantage of this is that the wear reserve, which is generally known to the person averagely skilled in the art as the space between the inner ring and the synchronizing ring in the axial direction, is reduced in this way, which is also not desired. A solution for this problem would be to reduce the height of the inner ring between the lugs. A consequence would then be the loss of friction surface on the inner ring which likewise does not lead to the desired result.

SUMMARY OF THE INVENTION

An object of the present invention is thus to make available an improved synchronizing ring which guarantees on the one hand that the inner ring with the lugs remains firmly anchored in the synchronizing ring at all times and in every operating state, even after long-term use and a considerable wear associated with this, wherein however the lugs of the inner ring do not have to be substantially lengthened and, at the same time, the height of the inner ring between the lugs is not reduced, so that no loss of the friction surface takes place and at the same time the wear reserve is preserved.

The invention relates to a synchronizing ring for a synchronizing ring apparatus of a switchable gear changing transmission, including a conical ring body with an inner friction surface and an outer installation surface, which respectively bound the ring body radially in a peripheral direction and extend conically at a pre-determinable friction angle about an axial synchronizing ring axis of the synchronizing ring, wherein the ring body is bounded in the axial direction at a largest cone diameter by a gear wheel surface with gear wheel extending substantially perpendicular to the synchronizing ring axis and is bounded at a smallest cone diameter by a surface and wherein a recess is provided at the surface of the synchronizing ring for fixing the inner ring with a security against rotation, in particular in the form of a lug. In accordance with the invention a raised portion and/or a displaced portion is provided at the surface of the synchronizing ring and an undercut is provided at the inner ring, so that the displaced portion engages in the undercut in the installed state in such a way that an overall constructional height of the synchronizing ring set consisting of inner ring and synchronizing ring is not enlarged by the displaced portion.

In some embodiments of the invention, raised portions, bulges, beads or other kinds of displaced portions are provided in the synchronizing ring in the installed state of the inner ring, preferably directly beside the features providing security against rotation, which are preferably formed by lugs known per se, and the undercut next to the lugs of the inner ring (which is as a rule present anyway due to the manufacturing process) is to be enlarged to such an extent that the displaced portions or the bulges or raised portions find a space there and are able to engage into place.

Thus the security against the synchronizing ring set falling apart is given by the invention and neither the wear reserve nor the size of the friction surfaces available is reduced.

The invention can further be used to advantage in all synchronizing ring systems, in which a plurality of components engage with one another, in particular also with multiple synchronizations.

In this connection the undercuts and the displaced portions can in principal be realized in any way, as long as only the displaced portions can engage into the undercuts and the displaced portions correspondingly find space in the undercuts.

In a preferred embodiment the displaced portion is provided by a bending over of an edge and/or by a local thickening, which is welded on, pressed through, screwed on or provided by other suitable means.

And/or the displaced portion can be formed by a web extending peripherally and section-wise in the peripheral ring of the synchronizing ring and/or the undercut can be formed by an undercut extending peripherally in the peripheral direction of the synchronizing ring.

In this arrangement the synchronizing ring set can of course also include a double cone ring.

The undercut can for example be formed by a depression and/or by a milled out feature and/or by another form of the undercut.

The undercuts and displaced portion in accordance with the present invention can also be provided at synchronizing sets for a synchronizing apparatus of a switchable gear changing transmission, which will be described in the following in detail. They for example include a synchronizing ring body with a friction surface and a support surface, with the friction surface and the support surface extending in the peripheral direction about an axial synchronizing ring axis of the synchronizing ring in such a way that a surface normal vector of the support surface lies parallel to the synchronizing ring axis and the friction surface extends conically at a pre-determinable friction angle about the synchronizing ring axis of the synchronizing ring. The synchronizing ring body can have a reinforcement, in particular a radial reinforcement, which extends in the peripheral direction in a pre-determinable width adjacent to the support surface. In this connection the support surface is interrupted by a recess in the synchronizing ring body.

The support surface of such synchronizing rings is interrupted by a recess in the synchronizing ring body. The friction surface available is certainly slightly reduced by the recess, however the recess guarantees that a hydrodynamic lubrication can build up which reliably prevents damage by too high frictional stress in the operating state, in other words during the synchronization process, when the support surface is in frictional contact with its counterpart, because the support surface is rotating at a certain relative speed with respect to its counterpart, even under high axial pressure which is transferred from the counterpart of the support surface to the support surface during the synchronizing process.

During the synchronization process the film of lubricating oil not only adheres on the support surface of the synchronizing ring but also on the surface of the counterpart which exerts a high axial pressure on the synchronizing ring, while at the same time the support surface and the corresponding surface of the counterpart rotate relative to one another at a certain relative velocity about a common axis.

In this arrangement the recesses form a storage reservoir for a certain amount of lubricating oil in the regions of the support surface in which the recesses are provided which, since the lubricating oil adheres simultaneously on the support surface and the surface of the counterpart, is also moved by the relative rotation of these two surfaces with respect to one another and is pressed in the direction of the rotation out of the recess into a narrowing gap between the support surface and the surface of the counterpart, as a result of which a hydrodynamic lubrication builds up which reliably separates the support surface and the surface of the counterpart during the synchronization process, so that damaging friction between the two partners no longer occurs.

In a preferred embodiment a security against rotation known per se is provided at a side of the synchronizing ring body lying opposite the support surface.

In a particularly important embodiment for practical use the reinforcement is formed on a side of the synchronizing ring body lying opposite the friction surface and the reinforcement is preferably formed by an enlarged wall thickness of the synchronizing ring body. The reinforcement can be achieved in this connection by a coined feature and/or an upset portion of the synchronizing ring body in the axial direction in the region of the support surface, so that in the region of the support surface a somewhat greater wall thickness of the synchronizing ring body is achieved so that a stiffening or reinforcement of the synchronizing ring is obtained.

In another embodiment the reinforcement can also be achieved via a fixed rim which, starting from one edge of the friction surface, forms a rim directed radially to the inside or the reinforcement can extend in the peripheral direction in any other suitable manner in a pre-determined width adjacent to the support surface.

A synchronizing ring in accordance with the invention can not only be designed as an inner synchronizing ring but also as an outer synchronizing ring; i.e. an outer peripheral surface and/or an inner peripheral surface can be designed as a friction surface.

In a particularly important embodiment of the present invention for practical use the recess in the synchronizing ring body is an arcuate recess, in particular a semicircular recess.

It will be understood that, depending on the requirement, the recess in the synchronizing ring body can also have any other suitable shape. Thus in the special case the recess can also be a triangular-shaped recess for example.

In particular, when a very stable hydrodynamic lubricating film has to be built up and/or when a high pressure has to be built up in the lubricating film, a contour of the recess in a peripheral direction, which corresponds to a rotational direction of the synchronizing ring in the operating state, can have a smaller gradient than a gradient which the contour has in the opposite peripheral direction. Thus the gap into which the lubricating oil is pressed in the operating state narrows over a shorter distance, so that a faster and/or greater pressure increase in the film of lubricating oil can be built up between the support surface and the surface of the counterpart of the support surface.

Depending on the use, the friction surface can be provided with a wear reducing and/or a friction optimized friction layer. In this connection the friction layer can be a thermal spray layer of molybdenum for example, a carbon friction layer or any other suitable friction layer which improves the friction characteristic of a synchronizing ring in accordance with the invention.

In this connection the synchronizing ring is preferably a non-cutting synchronizing ring formed in a non chip-forming manner from a thin-walled steel band which is formed as a deep-drawn sheet metal part and is manufactured from a steel, preferably from C55, C80 or C80M steel, preferably C35 or C45 steel and/or from another suitable metal and/or from a suitable metal alloy, for example brass.

A further class of synchronizing rings or synchronizing ring sets which will be described in the following can be equipped with an undercut in accordance with the invention and with a displaced portion in accordance with the invention and is thus also covered by the present invention.

The previously mentioned synchronizing rings or synchronizing ring sets for a synchronizing ring apparatus of a switchable gear changing transmission include a conical ring body with an inner friction surface and an outer installation surface which respectively bound the ring body radially in a peripheral direction and extend conically at a pre-determinable friction angle about an axial synchronizing ring axis of the synchronizing ring. In this connection the ring body is bounded in the axial direction at a largest cone diameter by a gear wheel surface with a gear wheel extending substantially perpendicular to the synchronizing ring axis and is bounded at a smallest cone diameter by a hub surface. A security against rotation is provided for fixing the synchronizing ring in a cylindrical cavity of a synchronizing ring hub, is integrally connected with the ring body and extends from the gear wheel surface of the ring body in the direction towards the hub surface. To guide the installed surface at an inner surface of the cylindrical cavity of the synchronizing ring hub a guide element is provided at the ring body in a pre-determined region between the guide wheel surface and the hub surface.

It is essential in these arrangements that a guide element is provided for the support or centering and guidance of the installation surface at an inner surface of the cylindrical cavity of the synchronizing ring hub in a pre-determinable region between the gear wheel surface and the hub surface. The guide element is preferably made available in the form of a plurality of bulges which are distributed across the installation surface in the peripheral direction.

Due to the fact that features providing security against rotation, preferably in the form of security lugs, are also provided in addition to the guide elements, a synchronizing ring in accordance with the invention is simultaneously effectively secured against a rotation relative to the synchronizing ring hub by the features providing security against rotation and at the same time is reliably guided and centered in the cylindrical cavity in the synchronizing ring hub in particular with respect to the radial direction.

That is to say such a synchronizing ring in accordance with the invention no longer has the tendency, due to its conical outer shape which cooperates with a cylindrical inner contact surface in the cylindrical cavity of the synchronizing ring hub, to undergo uncontrolled movements, such as small radial deflections or tilting movements, which can express themselves in unpleasant vibrations for example, as do the conical synchronizing rings known from the prior art. Due to this the reliability and precision of the synchronizing process is positively influenced significantly, which can contribute to a shortening of the gear change time, reduces the wear on the friction surface and on the whole synchronizing ring as such and thus contributes to longer repair and servicing intervals, quite apart from the fact that the ease of gear changing and the driving comfort of a vehicle is considerably improved due to the excellent guidance of the synchronizing ring in accordance with the invention in the cavity of the synchronizing hub. These positive effects have even more impact, i.e. have an even more pronounced effect, the more power or torque has to be switched by a corresponding transmission.

In a special embodiment the gear wheel surface is interrupted by a recess, in particular by one, or two, or three or more than three recesses, and/or the security against rotation is connected to the ring body in the recess.

In this connection it is preferable but not necessary to provide just as many features providing security against rotation as there are recesses in the gear wheel surface. In an embodiment which is particularly important for practical use, precisely three features providing security against rotation are provided which guarantee a maximum of security against rotation with a minimum of constructional expense.

The security against rotation can in particular be formed as a securing lug which extends on the side of the ring body remote from the synchronizing ring hub, substantially in the same direction as the installation surface.

In a very special embodiment the securing lug can be a securing lug with a pocket-shaped recess through which, in the individual case, an improved anchoring of the synchronizing ring in the synchronizing ring hub can be achieved.

The number of the guide elements which can be provided at a synchronizing ring such as this in accordance with the invention preferably lies between two and nine guide elements, especially three guide elements, with six guide elements being particularly preferably provided and/or with, in each case, two guide elements being arranged in the peripheral direction at a substantially equal spacing and/or with, in each case, two guide elements being respectively arranged between two features providing security against rotation, whereby a high degree of radial guidance can be guaranteed with a minimum of constructional expense.

In an embodiment which is particularly important for practical use the guide element is designed on the installation surface in the shape of a bulge of the ring body, the bulge extending radially away from the synchronizing ring axis towards the outside.

A wear minimizing and/or a friction optimizing friction medium, such as a friction coating, is preferably provided on or at the friction surface. The friction coating may be a molybdenum coating. The friction layer may be a carbon friction layer.

The synchronizing ring is manufactured from a shaped sheet metal part manufactured from a deep drawing quality sheet metal and/or from a steel, preferably from C55, C80 or C80M steel, in particular from C35 or C45 steel.

The invention further relates to a synchronizing ring set with a synchronizing ring in accordance with the invention and a manual gear changing transmission for a vehicle, in particular for a passenger vehicle, a transporter or a heavy goods vehicle with a synchronizing ring in accordance with the invention.

BRIEF DESCRIPTION OF THE DRAWINGS

The invention will be explained more closely in the following with the help of the schematic drawing, which shows.

DESCRIPTION OF THE PREFERRED EMBODIMENTS

Figure 1:
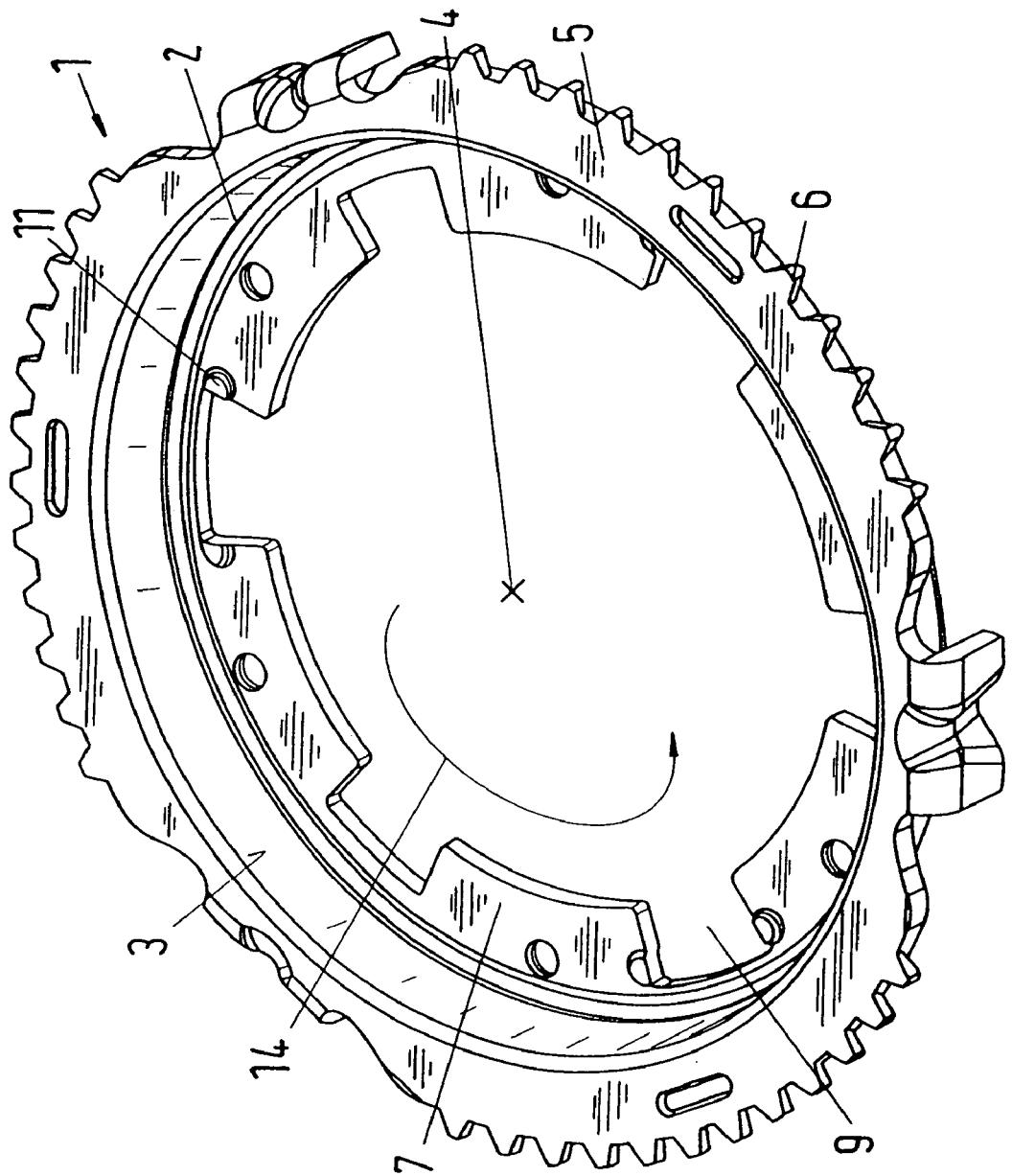
FIG. 1 is a perspective view of a first embodiment of a synchronizing ring in accordance with the invention in section.

FIGS. 1 to 7 show embodiments of synchronizing rings in accordance with the invention in schematic illustrations, from different views, partly in section, which are designated as a unit in the following by the reference numeral 1. In this connection the same reference numerals in the different figures designate technically equivalent features or relate to features with the same technical function.

Figure 2:
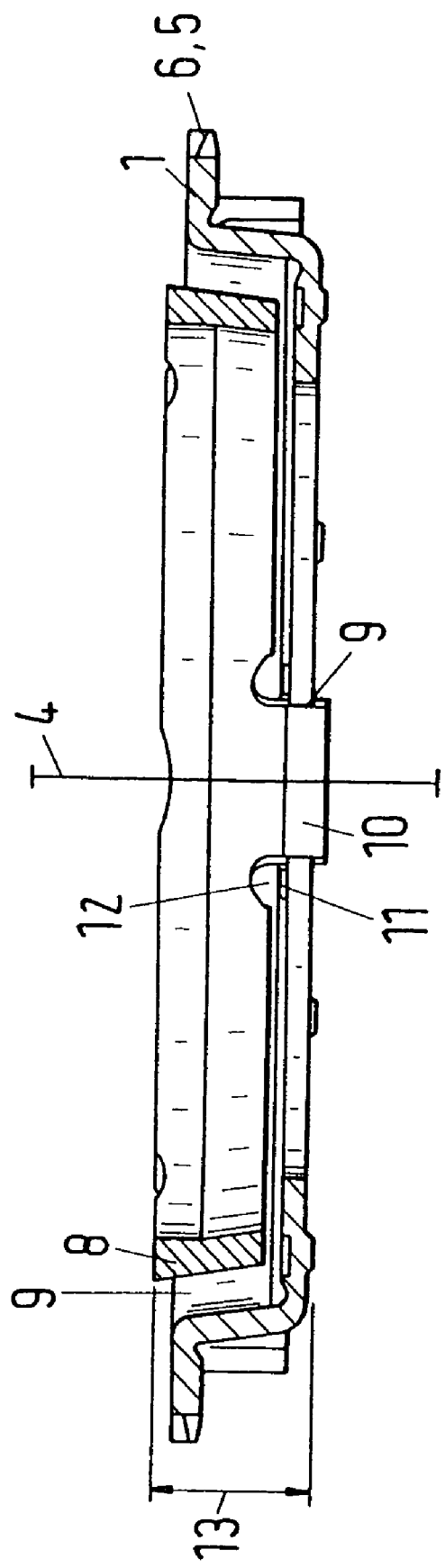
FIG. 2 is a cross-sectional view of a synchronizing ring set with a synchronizing ring and an inner ring.
Figure 3:
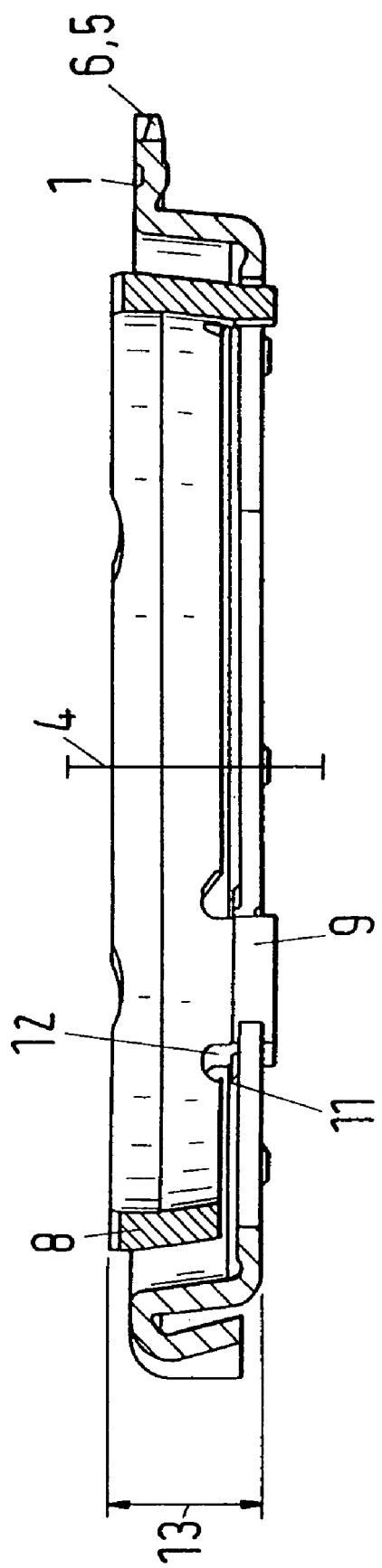
FIG. 3 is a cross-sectional view of a second embodiment in accordance with FIG. 2.
Figure 4:
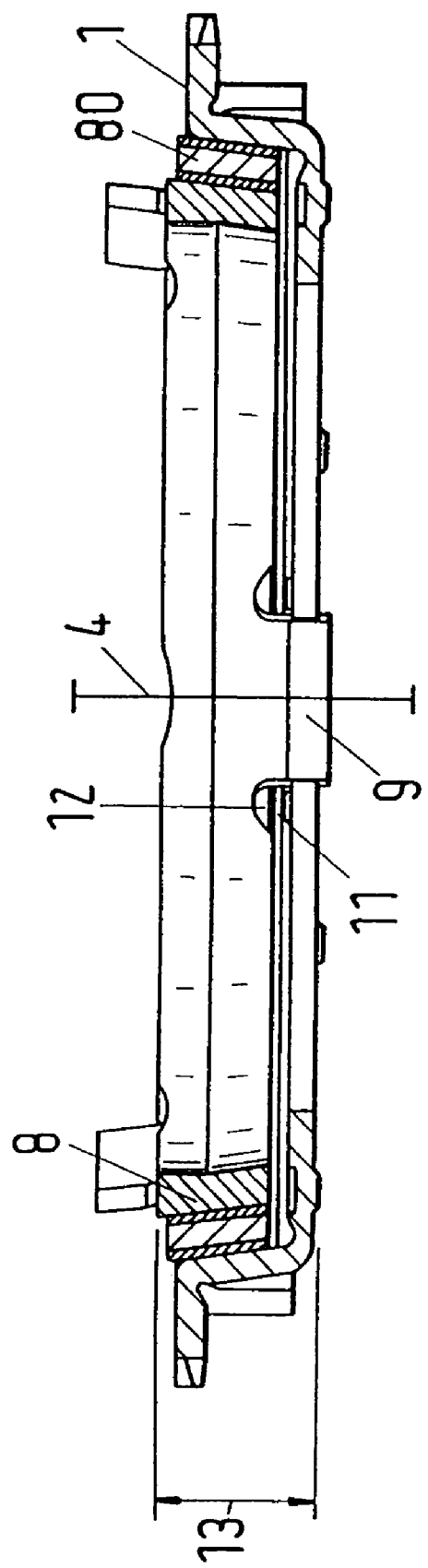
FIG. 4 is a cross-sectional view of an embodiment with a second inner ring.
Figure 5:
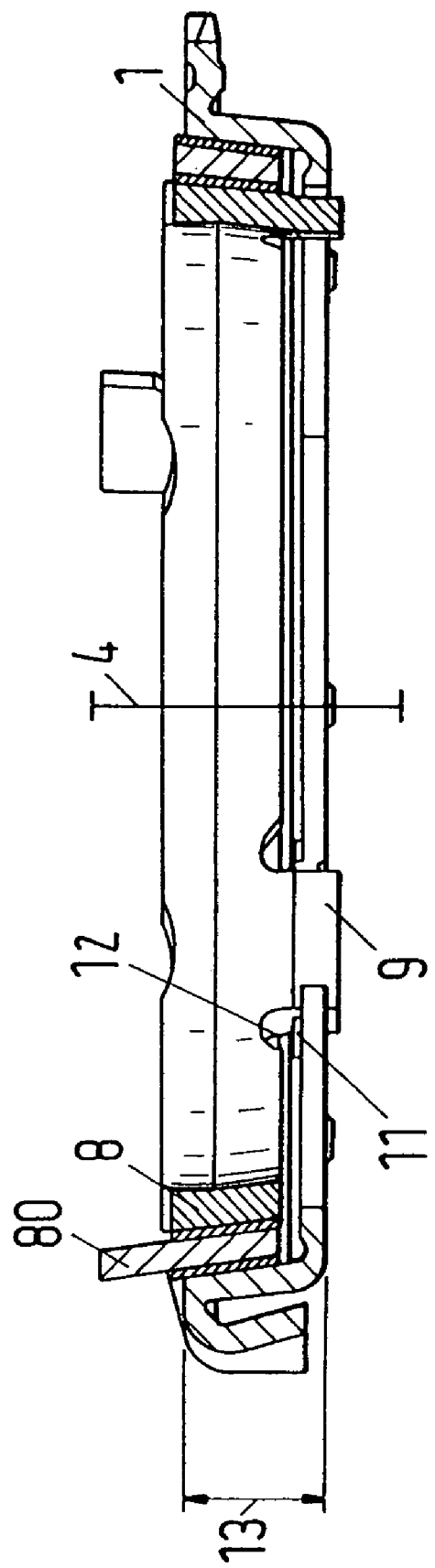
FIG. 5 is a cross-sectional view of the embodiment of FIG. 4 from a different perspective.
Figure 6:
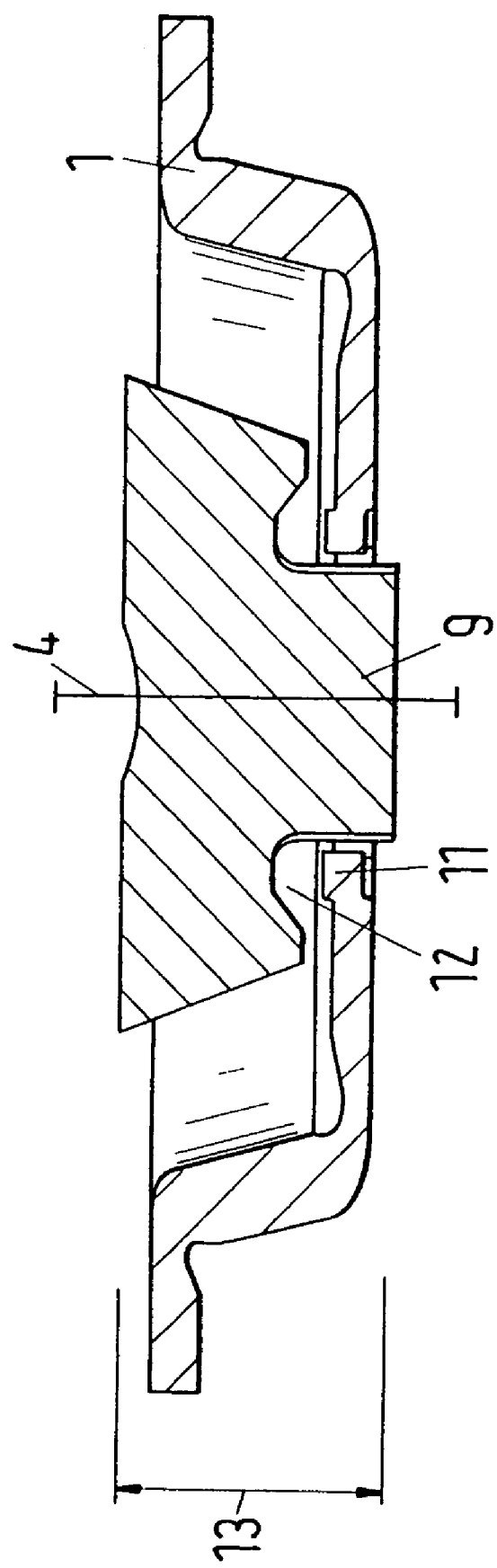
FIG. 6 is a cross-sectional view of a third embodiment in accordance with FIG. 2.
Figure 7:
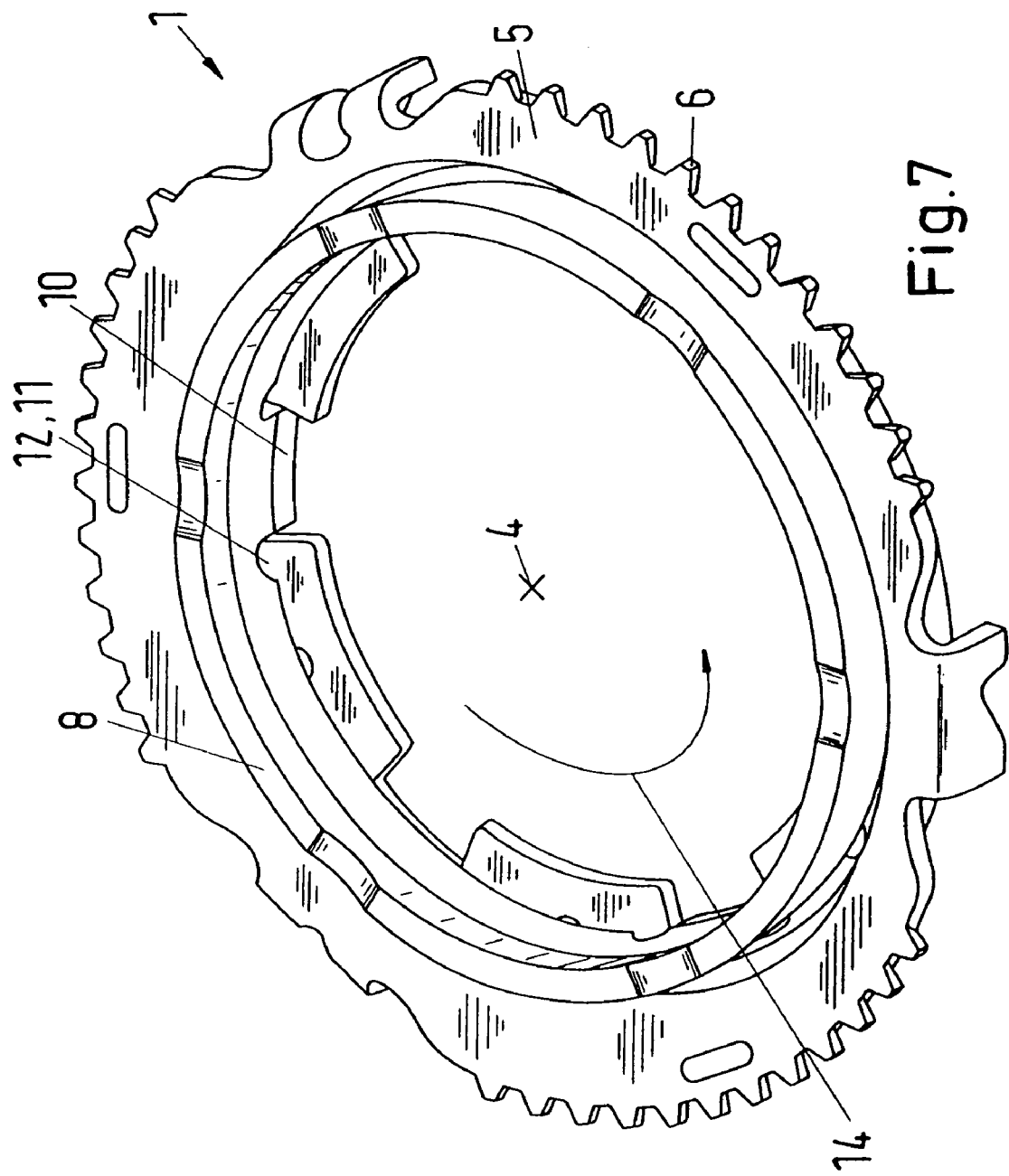
FIG. 7 is a perspective view of a synchronizing ring set in accordance with FIG. 2 in a perspective view.

A first embodiment of a synchronizing ring in accordance with the invention is illustrated in section in FIG. 1. FIG. 2 shows a synchronizing ring set with a synchronizing ring and an inner ring. A second embodiment in accordance with FIG. 2 is schematically illustrated in FIG. 3. FIG. 4 shows an embodiment with a second inner ring 80. The embodiment of FIG. 4 is illustrated from a different perspective in FIG. 5. FIG. 6 shows a third embodiment in accordance with FIG. 2, and finally a synchronizing ring set in accordance with FIG. 2 is shown in a perspective view in FIG. 7.

The embodiments of synchronizing rings or synchronizing ring sets of FIGS. 1 to 7 are known per se in this connection, except that in accordance with the invention the examples illustrated in FIGS. 1 to 7 have a displaced portion 11 and an undercut 12.

FIGS. 1 to 7 thus show different embodiments of synchronizing rings 1 or synchronizing ring sets in accordance with the invention for a synchronizing apparatus of a switchable change gear transmission. They include a conical ring body 2 with an inner friction surface 3 and an outer installation surface, which respectively bound the ring body 2 radially in a peripheral direction and extend conically at a pre-determined friction angle about an axial synchronizing ring axis 4 of the synchronizing ring, with the ring body 2 being bounded in the axial direction at a largest cone diameter by a gear wheel surface 5 with a gear wheel 6, with the gear surface 5 extending substantially perpendicular to the synchronizing ring axis 4 and with the ring body being bounded at a smallest cone diameter by a surface 7. At the surface 7 of the synchronizing ring 1 there is provided a recess 9 for fixing the inner ring 8 using a security against rotation 10 which is provided at the inner ring 8, in particular in the shape of a lug 10. In accordance with the invention a raised portion 11 or displaced portion 11 is provided at the surface 7 of the synchronizing ring 1 and an undercut 12 is provided at the inner ring 8, so that the displaced portion 11 can engage in the undercut 12 in the installed state in such a way that an overall constructional height 13 of the synchronizing ring set of inner ring 8 and synchronizing ring 1 is not enlarged by the displaced portion 11.

The displaced portion 11 can be especially provided by a bending over of an edge 11 and/or by a local thickening, by which is welded on, pressed through, screwed on or can be provided by other suitable means.

In this connection the displaced portion 11 can be formed by a web 11 extending peripherally and section-wise in the peripheral ring 14 of the synchronizing ring and/or the undercut 12 can be formed by an undercut extending peripherally in the peripheral direction 14 of the synchronizing ring.

The undercut 12 at the synchronizing ring 1 can also be formed by a depression 12 and/or by a milled out feature 12 and/or by a different form of the undercut 12.

It is to be understood that all of the embodiments explicitly discussed in this application are only to be understood as exemplary for the invention and in particular also all suitable combinations which can be advantageously applied for special applications or that further developments obvious to the person averagely skilled in the art are covered by the invention.

The invention claimed is:

1. A synchronizing ring for a synchronizing apparatus of a switchable gear changing transmission, comprising:
    a conical ring body comprising an inner friction surface and an outer installation surface which respectively bound the ring body radially in a peripheral direction and extend conically at a pre-determinable friction angle about an axial synchronizing ring axis of the synchronizing ring, wherein the ring body is bounded in the axial direction at a largest cone diameter by a gear wheel surface with a gear wheel extending substantially perpendicular to the synchronizing ring axis and is bounded at a smallest cone diameter by an additional surface,
    a recess provided at the additional surface of the synchronizing ring, configured for a lug provided on an inner ring to extend into the recess to thereby fix the inner ring against rotation with respect to the synchronizing ring, and
    a protrusion provided at the additional surface of the synchronizing ring, wherein the protrusion is configured to extend into an undercut provided at the inner ring in the installed state, wherein the protrusion is dimensioned to be fully accommodated within the undercut and not extend beyond the undercut in any of the axial, radial, or circumferential directions of the synchronizing ring.

2. A synchronizing ring in accordance with claim 1 wherein the protrusion comprises a bent over edge or a local thickening which is attached to the additional surface of the synchronizing ring.

3. A synchronizing ring in accordance with claim 1, wherein the protrusion comprises a web extending peripherally and section-wise in the peripheral direction of the synchronizing ring and the undercut extends peripherally in the peripheral direction of the synchronizing ring.

4. A synchronizing ring in accordance with claim 1, wherein the synchronizing ring includes a double cone ring.

5. A synchronizing ring in accordance with claim 1, wherein the undercut comprises a depression or a milled out feature.

6. A synchronizing ring set with a synchronizing ring in accordance with claim 1.

7. A manual gear change transmission for a motor vehicle, a passenger vehicle, a transporter or a heavy goods vehicle comprising a synchronizing ring in accordance with claim 1.

8. A manual gear change transmission for a motor vehicle for a passenger vehicle, a transporter or a heavy goods vehicle comprising a synchronizing ring set in accordance with claim 6.

9. A synchronizing ring in accordance with claim 1, wherein the protrusion is generally transverse to the additional surface.

10. A synchronizing ring in accordance with claim 1, wherein the protrusion is substantially perpendicular to the additional surface.

11. A synchronizing ring set for a synchronizing apparatus of a switchable gear changing transmission, comprising:
    a synchronizing ring, comprising:
        a conical ring body comprising a conical inner friction surface and a conical outer installation surface which respectively bound the ring body radially in a peripheral direction and extend conically at a pre-determinable friction angle about an axial synchronizing ring axis of the synchronizing ring, wherein the ring body is bounded in the axial direction at a largest cone diameter by a gear wheel surface with a gear wheel extending substantially perpendicular to the synchronizing ring axis and is bounded at a smallest cone diameter by an additional surface,
        a recess provided at the additional surface of the synchronizing ring, and
        a protrusion provided at the additional surface of the synchronizing ring, and
    an inner ring, comprising:
        a lug, configured to extend into the recess of the synchronizing ring to thereby fix the inner ring against rotation with respect to the synchronizing ring, and
        an undercut provided at the inner ring configured to receive the protrusion of the synchronizer ring in the installed state, wherein the undercut is dimensioned to accommodate an entirety of the protrusion such that the protrusion does not extend beyond the undercut in any of the axial, radial, or circumferential directions of the synchronizing ring.

12. A synchronizing ring set in accordance with claim 11 wherein the protrusion comprises a bent over edge or a local thickening which is attached to the additional surface of the synchronizing ring.

13. A synchronizing ring set in accordance with claim 11, wherein the protrusion comprises a web extending peripherally and section-wise in the peripheral direction of the synchronizing ring and the undercut extends peripherally in the peripheral direction of the synchronizing ring.

14. A synchronizing ring set in accordance with claim 11, wherein the synchronizing ring set includes a double cone ring.

15. A synchronizing ring set in accordance with claim 11, wherein the undercut comprises a depression or a milled out feature.

16. A manual gear change transmission for a motor vehicle, a passenger vehicle, a transporter or a heavy goods vehicle comprising a synchronizing ring set in accordance with claim 11.

17. A synchronizing ring set in accordance with claim 11, wherein the protrusion is generally transverse to the additional surface.

18. A synchronizing ring set in accordance with claim 11, wherein the protrusion is substantially perpendicular to the additional surface.

* * * * *